US010309750B2

(12) United States Patent
Olkinuora

(10) Patent No.: US 10,309,750 B2
(45) Date of Patent: Jun. 4, 2019

(54) METHOD AND A SYSTEM FOR INCREASING AIMING ACCURACY OF A SNIPER RIFLE

(71) Applicant: Sako Oy, Riihimäki (FI)

(72) Inventor: Sampsa Olkinuora, Nurmijärvi (FI)

(73) Assignee: Sako Oy, Riihimäki (FI)

( * ) Notice: Subject to any disclaimer, the term of this patent is extended or adjusted under 35 U.S.C. 154(b) by 0 days.

(21) Appl. No.: 16/006,023

(22) Filed: Jun. 12, 2018

(65) Prior Publication Data

US 2018/0372450 A1 Dec. 27, 2018

(30) Foreign Application Priority Data

Jun. 14, 2017 (FI) ..................................... 20175549

(51) Int. Cl.
*F41G 3/08* (2006.01)
*G01P 3/66* (2006.01)
*F41A 21/30* (2006.01)
*F41A 21/32* (2006.01)
*F41G 1/38* (2006.01)
*F41G 3/06* (2006.01)
*F41G 3/12* (2006.01)
*F41G 3/14* (2006.01)
*F41G 1/473* (2006.01)

(52) U.S. Cl.
CPC ................ *F41G 3/08* (2013.01); *F41A 21/30* (2013.01); *F41A 21/32* (2013.01); *F41G 1/38* (2013.01); *F41G 1/473* (2013.01); *F41G 3/065* (2013.01); *F41G 3/12* (2013.01); *F41G 3/142* (2013.01); *G01P 3/665* (2013.01)

(58) Field of Classification Search
CPC ... F41G 3/08; F41G 1/38; F41G 1/473; F41G 3/065; F41G 3/12; F41G 3/142; F41A 21/30; F41A 21/32; G01P 3/665
USPC ....................................................... 235/404
See application file for complete search history.

(56) References Cited

U.S. PATENT DOCUMENTS 6,064,196 A    5/2000  Oberlin et al.
2004/0231220 A1 11/2004 McCormick
(Continued)

FOREIGN PATENT DOCUMENTS

DE   102006058375 A1   6/2008
EP       0783095 A1   7/1997
(Continued)

OTHER PUBLICATIONS

European Patent Office, Extended European Search Report dated Oct. 23, 2018 in the EP patent application No. 18176730.2-1011, 6 pages.

(Continued)

*Primary Examiner* — Daniel A Hess
(74) *Attorney, Agent, or Firm* — Berggren LLP

(57) ABSTRACT

The invention relates to an aiming method, aiming system and computer program product utilized in the aiming method where also a real-time bullet velocity of a fired shot by a sniper rifle is utilized. The bullet velocity is measured in a suppressor in real-time for each fired shot. The suppressor sends the measured bullet velocity to a data logger of the sniper rifle. The data logger updates a bullet trajectory to a target after each fired shot and on the bases of an updated bullet trajectory the data logger sends new reticle setting to an optical scope connected to the sniper rifle.

11 Claims, 4 Drawing Sheets

(56) References Cited

U.S. PATENT DOCUMENTS

| | | |
|---|---|---|
| 2005/0114084 A1 | 5/2005 | Johnson et al. |
| 2008/0039962 A1 | 2/2008 | Mcrae |
| 2012/0125092 A1 | 5/2012 | Downing |
| 2014/0283429 A1* | 9/2014 | Sullivan ................ F41G 11/003 42/111 |
| 2017/0097216 A1* | 4/2017 | Sullivan ................ F42B 12/387 |

FOREIGN PATENT DOCUMENTS

| | | |
|---|---|---|
| EP | 2749889 A1 | 7/2014 |
| EP | 2781875 A2 | 9/2014 |
| EP | 2784518 A2 | 10/2014 |
| WO | 2008091388 A2 | 7/2008 |

OTHER PUBLICATIONS

Finnish Patent Office, Search report dated Dec. 13, 2017 in FI patent application No. 20175549.

* cited by examiner

METHOD AND A SYSTEM FOR INCREASING AIMING ACCURACY OF A SNIPER RIFLE

PRIORITY

This application claims priority of Finnish application FI 20175549 filed on 14 Jun. 2017 the content of which is incorporated herein by reference.

FIELD OF THE INVENTION

The invention relates to an aiming method and aiming system for increasing a hit probability of a shot fired by a sniper rifle to a target. The invention relates also to a computer program product that is utilized in the aiming method. The invention relates also to a suppressor that is connectable to the sniper rifle.

BACKGROUND OF THE INVENTION

To a hit probability of a shot fired by a rifle affects many physical and meteorological conditions. Some examples are temperature, humidity, air pressure a heading of a barrel of the sniper rifle, a position of the barrel of the sniper rifle and a velocity of the shot bullet.

Positioning applications for different kind of guns are known. For example publication WO 2009/130732 discloses a monitoring device to be attached to or integrated into a gun, by means of which device with a GPS positioning device the current location of a certain gun and the location of shots possibly fired with the gun and the occurrence time of the shots can be determined. This data is stored both in the monitoring device and in a separate database, from which measuring data related to the gun can be analysed afterwards.

Publication US 2004/0231220 discloses an optical apparatus for aiming, in which shoot settings are modified when meteorological, heading of the sniper rifle and a barrel position of the gun are known. However, assessed bullet trajectory information and muzzle velocity value must be entered to the optical measurement apparatus manually by the shooter. After feeding of information, the optical apparatus automatically adjusts the settings by the measured and inputted data.

SUMMARY OF THE INVENTION

The object of the invention is to introduce a new aiming method for a sniper rifle, a new aiming system utilized in connection of the sniper rifle, a new computer program product utilized in the aiming method and a new suppressor utilised in the sniper rifle, by means of which a sniper performing shooting has an increased probability to hit to the reconnoitred target.

The objects of the invention are attained with an aiming method and aiming system, where a suppresser connected to the sniper rifle has electrical measurement means to measure a bullet velocity in real-time and wireless transmission means for transmitting the measured bullet velocity to a data logger of the sniper rifle.

To the sniper rifle is connected an optical scope comprising advantageously a laser range finder. The optical scope comprises transmission means to transmit the measured range to a target to the data logger.

The data logger has electrical means for measuring or retrieving meteorological data of the scene. The data logger advantageously comprises means for measuring or retrieving also with geographical location data, heading of the sniper rifle and also a barrel position of the sniper rifle. The data logger utilizes the bullet velocity with other measurement data for calculating a bullet trajectory. Based on the calculated bullet trajectory the data logger sends to an optical scope of the sniper rifle new reticle settings where also the bullet velocity of the last shot bullet has been taken into account.

An advantage of the invention is that a real-time bullet velocity is measured and utilized in the aiming process of a sniper rifle.

Another advantage of the invention is that utilization of the velocity value of the last shot bullet increases a probability of a next bullet to be fired to hit the target.

Another advantage of the invention is that the aiming method and aiming system functions without any additional measure to be made by the sniper.

A further advantage of the invention is that a geographical coordinates of the target can be estimated by combining GPS information, measured range to the target and heading information of the sniper rifle.

The aiming system according to the invention for increasing a hit probability of a sniper rifle, which comprises
- a scope connected to the sniper rifle comprising means configured to measure a range to a target by a laser apparatus when a trigger in a sniper rifle grip is pressed to a first position, and
- a data logger of the sniper rifle being configured to measure
  - local meteorological data comprising at least temperature, humidity and air pressure
  - a geographical location of the sniper rifle
  - a heading of a barrel of the sniper rifle
  - a position of the barrel of the sniper rifle, and
  - to receive the range to the target sent by the scope, and that
- the data logger is configured to calculate a bullet trajectory for a shot by utilizing the range, meteorological data and for a first shot to be fired velocity information of a bullet shot in the similar meteorological conditions stored in the data logger and based on the calculated bullet trajectory to send elevation information to the scope, and that
- the sniper rifle is configured to shoot a bullet when the trigger in the rifle grip is pressed to a second position, is characterized in that the measurement system further comprises
- a suppressor configured to measure a velocity of the shot bullet and to send wirelessly the measured velocity of the shot bullet to the data logger, and that
- the data logger is configured to utilize the measured velocity of the shot bullet when calculating an improved bullet trajectory for a next bullet to be shot.

The suppressor according to the invention, that is utilized for increasing a hit probability of a sniper rifle, comprises at least two sound traps, is characterized in that the suppressor further comprises at least two sound traps including either capacitive or inductive sensors that both sensors are configured to generate an electrical pulse when a shot bullet passes by said capacitive or inductive sensors.

The aiming method according to the invention for increasing a hit probability of a sniper rifle, comprising steps of
- measuring by a scope connected to sniper the rifle a range to a target and sending the measured range to a data logger of the sniper rifle when a trigger of a rifle grip of the sniper rifle is pressed to a first position measuring by the data logger
- local meteorological data comprising at least temperature, humidity and air pressure
- a location of the sniper rifle
- a heading of a barrel of the rifle, and
- a position of the barrel of the sniper rifle, and calculating by the data logger a bullet trajectory for a shot by utilizing the measured range, meteorological measurement data and for a first shot to be fired velocity information of a bullet shot in the similar meteorological conditions stored in the data logger sending a calculated elevation information to the scope, and shooting by the sniper rifle when the trigger of the rifle grip is pressed to a second position, is characterized in that the method further comprises steps of
- measuring a velocity of the shot bullet by a suppressor and sending wirelessly the measured velocity from the suppressor to the data logger,
- storing the measured bullet velocity in a memory of the data logger, and
- calculating an improved bullet trajectory for a next bullet to be shot by the data logger by utilizing also the stored velocity data of the shot bullet.

The computer program product comprising computer program code means adapted to perform the following program code steps when said program is executed on when said program is executed on a processor of a data logger of a sniper rifle for increasing a hit probability, comprising
- code means for measuring a range to a target by utilizing a scope connected to the sniper rifle
- code means for measuring
  - local meteorological data comprising at least temperature, humidity and air pressure
  - a location of the sniper rifle
  - a heading of a barrel the rifle, and
  - a position of the barrel of the sniper rifle, and
- code means for calculating a bullet trajectory for a shot by utilizing the measured range, meteorological measurement data and for a first shot to be fired velocity information of a bullet shot in the similar meteorological conditions stored in the data logger, and
- code means for sending a calculated elevation information to the scope, is characterized in that in the computer program product further comprises
- code means for receiving a velocity of the shot bullet measured by a suppressor
- code means for storing the received bullet velocity in a memory of the data logger, and
- code means for calculating an improved bullet trajectory for a next bullet to be shot by utilizing also the stored velocity data of the shot bullet.

The idea of the invention is basically as follows. In the aiming system and aiming method according to the invention an optical scope comprising advantageously a laser range finder is connected to a sniper rifle. The optical scope comprises transmission means to transmit the measured range to a detected target to the data logger of the sniper rifle.

In the aiming system and aiming method according to the invention also a velocity of a bullet of a sniper rifle is determined in real time in a suppressor according to the invention that is connected to the barrel of the sniper rifle. The suppressor advantageously sends the defined bullet velocity to the data logger of the sniper rifle. The data logger stores the measured bullet velocity in its memory.

The data logger combines the bullet velocity with meteorological data of the scene and geographical location data, heading of the sniper rifle and also with barrel position of the sniper rifle, i.e. the angle of the barrel of the sniper rifle from the horizontal plane. After the combination process the data logger sends to the optical scope of the sniper rifle real-time reticle settings where also the bullet velocity of the last shot bullet has been taken into account. Utilization of the new settings increases a probability that the next shot to be fired hit the target.

BRIEF DESCRIPTION OF THE DRAWINGS

The invention is described in detail below. Reference is made to the accompanying drawings in which.

DETAILED DESCRIPTION

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

The present invention makes possible to increase a hit probability of a sniper rifle 1 by utilizing real-time bullet velocity information that is measured in a suppressor 3 according to the invention.

Figure 1:
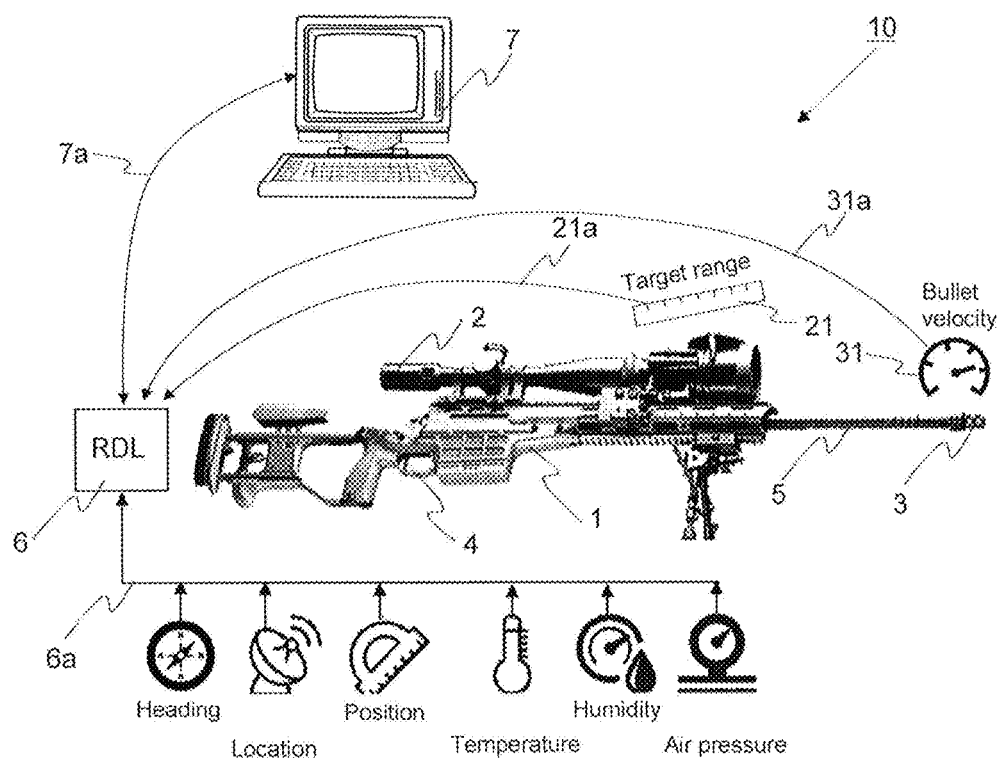
FIG. 1 shows main functional elements of a aiming system according to the invention for increasing a hit probability of a sniper rifle.

FIG. 1 depicts some functional elements of an exemplary aiming system 10 according to the invention that advantageously may be utilized for increasing a hit probability of a sniper rifle 1. The aiming system 10 comprises a closed loop ballistic control system.

The aiming system 10 advantageously comprises a rifle data logger (RDL) 6 that may be an auxiliary equipment or an integrated part of the sniper rifle 1. The data logger 6 may have wired or wireless connections to a trigger 4, scope 2 and suppressor 3 of the sniper rifle 1. The aiming system 10 may comprise also an auxiliary computer 7 or another data processing equipment or service, for example a cloud service, whereto the data logger 6 may send different kind of measurement results advantageously via a wireless communication network 7a. Via the wireless communication network it is also possible to send to the data logger 6 different kind of information that is useful to the shooter.

The data logger 6 may also comprise electrical elements for defining a geographical coordinates of the sniper rifle 1, for example a GPS receiver.

The data logger 6 comprises also electrical elements by which heading of the sniper rifle and position a barrel 5 of the sniper rifle 1, i.e. the angle of the barrel of the sniper rifle from the horizontal plane, is defined in real time. The measurement results 6a of above-mentioned measurement apparatuses are transmitted to the data logger 6 either via a wired data connection or a wireless data connection.

The aiming system 10 according to the invention advantageously utilizes also meteorological measurement data such as temperature, humidity and air pressure at the locus of the shooting event. In one advantageous embodiment the data logger 6 receives said meteorological measurement 6a data via a wireless link from an auxiliary measurement apparatus.

To the sniper rifle 1 is advantageously connected a scope 2 via which the shooter aims the sniper rifle 1. In one advantageous embodiment the scope may comprise a range finder 21 that is based on laser measurement. The range finder 21 advantageously sends the defined distance to a target to the data logger 6.

In one advantageous embodiment the data logger 6 may determine coordinates of the target by utilizing GPS coordinates of the sniper rifle 1, heading of the sniper rifle and defined range to the target. The determined coordinates of the target may be utilized by fire control.

To an end of a barrel 5 of the sniper rifle 1 is mechanically connected a suppressor 3 according to the invention. The suppressor 3 advantageously comprises at least two either capacitive or inductive sensors that generate electrical signals when the bullet passes by the sensors. From the electrical signals the suppressor 3 calculates a velocity of the bullet 31. The suppressor 3 sends the calculated velocity value 31a of the shot bullet to the data logger 6 advantageously in real time. The data logger 6 stores the bullet velocity in its memory.

A computer program according to the invention executed in the processor of the data logger 6 utilizes above-mentioned real time heading, location, position, meteorological and velocity data of the shot bullets to change a locus of a reticle in the scope 2 so that a next bullet to be shot has greater possibility to hit to the target.

Figure 2:
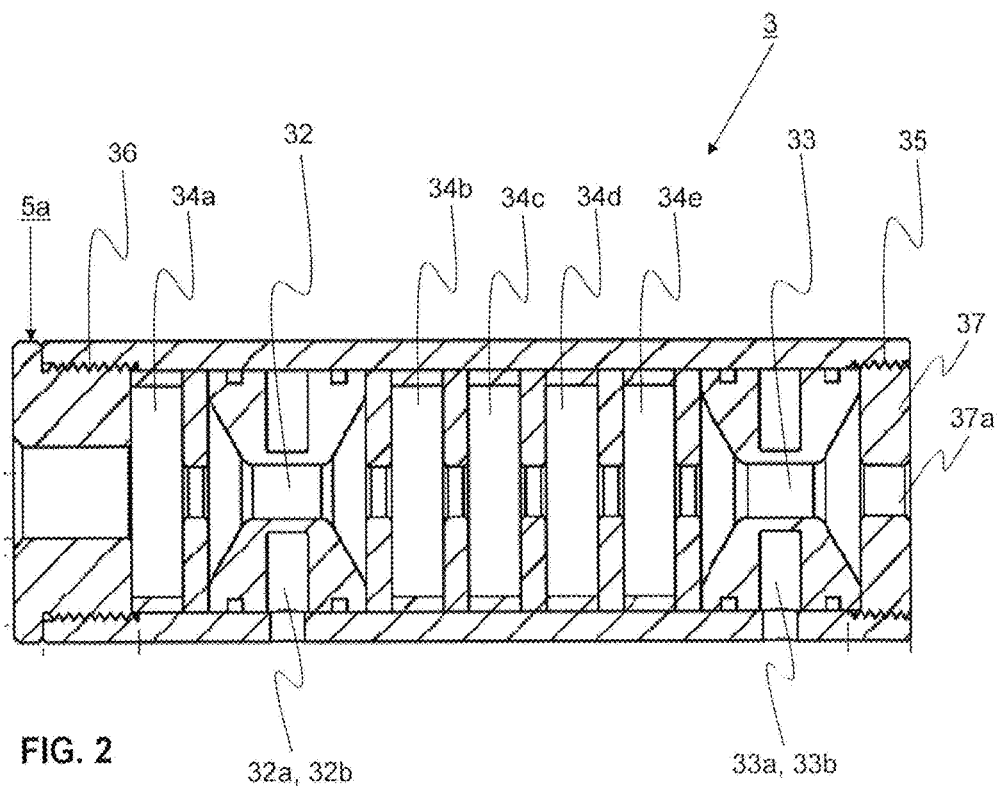
FIG. 2 shows an example of a suppressor according to the invention.

FIG. 2 depicts a mechanical structure of a suppressor 3 according to the invention that is advantageously utilized in the aiming system 10 according to the invention for increasing a hit probability of a sniper rifle 1.

The suppressor 3 comprises a screw thread 36 in a first end of the suppressor 3. End portion 5a of the barrel 5 of the sniper rifle 1 has also a screw thread that is configured to fit to the screw thread 36 of the suppressor 3 when the suppressor is used.

In a second end of the suppressor 3 is also a screw thread 35 where an end element 37 of the suppressor 3 is configured to be installed to. In the center of the end element 37 is an opening 37a whose diameter is greater than a diameter of a bullet to be shot.

In the direction of the longitudinal axis of the suppressor 3 there are consecutively several sound traps known in the art, references 34a, 34b, 34c, 34d and 34e. Between depicted sound traps 34a and 34b there can be seen also a special sound trap 32 that comprises either a first capacitive sensor 32a or a first inductive sensor 32b.

A second special sound trap 33 can be seen between the sound trap 34e and the end element 37 of the suppressor 3. Also the second special sound trap 33 comprises either a second capacitive sensor 33a or a second inductive sensor 33b. A distance between the first special sound trap 32 and the second special sound trap 33 is fixed.

In one advantageous embodiment the suppressor 3 comprises the first and second capacitive sensors 32a and 33a.

In another advantageous embodiment the suppressor 3 comprises the first and second inductive sensors 32b and 33b.

Figure 3A:
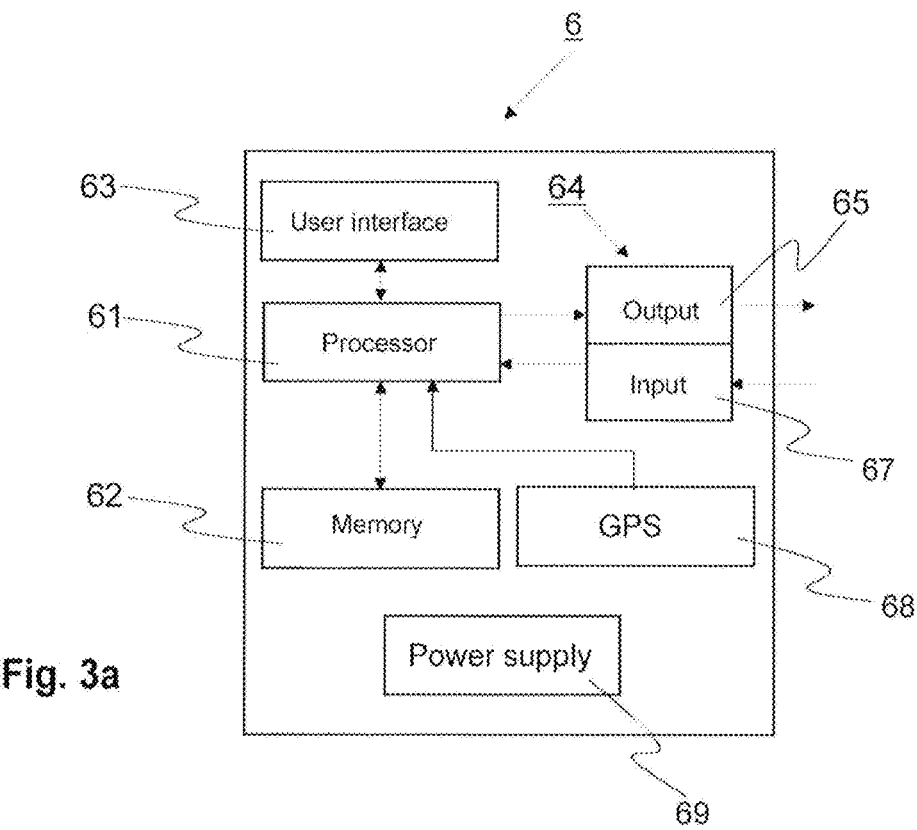
FIG. 3a shows functional electrical elements utilized in the implementation of a data logger utilized in the sniper rifle.

FIG. 3a shows some main functional electrical elements or parts of the data logger 6 (RDL) according to the invention that may be utilized in a sniper rifle 1 for increasing a hit probability of shots fired by it.

The data logger 6 includes a power supply 69. The power supply 69 may be a battery, a solar cell or an electrical energy source that is based on recoils that the shots generate.

The data logger 6 comprises a processor 61 or processor means, which advantageously comprise an arithmetic logic unit, a number of different registers and control circuits. A data storing arrangement, such as memory unit 62, whereon computer-readable information such as programs utilized for accomplishing the inventive method or different kind of measurement data may be stored, has been connected to the processor 61. The memory 62 typically contain memory units, which allow both reading and writing functions (Random Access Memory, RAM), and memory units containing non-volatile memory, from which data can only be read (Read Only Memory, ROM).

Advantageously the data logger 6 also may comprise a GPS receiver 68 by which a geographical coordinates of the sniper rifle 1 may be determined and saved in the memory 62.

The data logger 6 comprises advantageously also an electrical interface element 64, which may comprise an input 67 and an output 65. The input 67 and output 65 may advantageously comprise both wired and wireless electrical connection elements, by which the data logger 6 may establish connections to the other functional elements of the aiming system 10 of the sniper rifle 1.

Data received with the input 67 is advantageously transferred to the processor 61 of the data logger 6. Via the input 67 the data logger 6 may receive for example data 6a from meteorological sensors such as a temperature sensor, a humidity sensor, and an air pressure sensor. Via the input 67 before shooting also heading and position information of a barrel 5 of the sniper rifle 1 may advantageously be inputted to the data logger 6. The data logger 6 utilizes received information when it calculates a new elevation angle to the sniper rifle 1 by changing settings of a reticle of the scope 2.

In one advantageous embodiment GPS data may be inputted to the data logger 6 from some auxiliary equipment for example from a mobile phone via the input 67.

Via wireless input elements of the input 67 the data logger 6 may receive a target range 21 from a laser rangefinder that may be connected or integrated to the scope 2. Via the wireless input elements the data logger 6 may also receive a measured bullet velocity 31 from the suppressor 3.

The interface element 64 also comprises an output 65, with which utilized different kind instructions and measurement data may be transferred from or to the data logger 6 to or from other functional elements of the aiming system 10 of the sniper rifle 1. Via the output 65 the processor 61 may advantageously send the bullet trajectory measurement results and number of fired shots to an auxiliary data processing device 7, for example. The data processing device 7 may comprise maintenance detector elements that stores when and where shots were fired and number of shots fired, for example.

The data logger 6 may also comprise a user interface 63, which comprises means for receiving data and/or control commands from the person using the sniper rifle 1. The user interface 63 may be for example a touch screen.

The processor 61, the memory 62, the interface element 64 and the user interface 63 are electrically connected together to systematically execute received and/or stored data or information in accordance with predetermined and substantially preprogrammed operational sequences. Such operational sequences also include the operational sequences of a computer product by which the depicted method steps of FIG. 4 by which a bullet trajectory is defined.

Figure 3B:
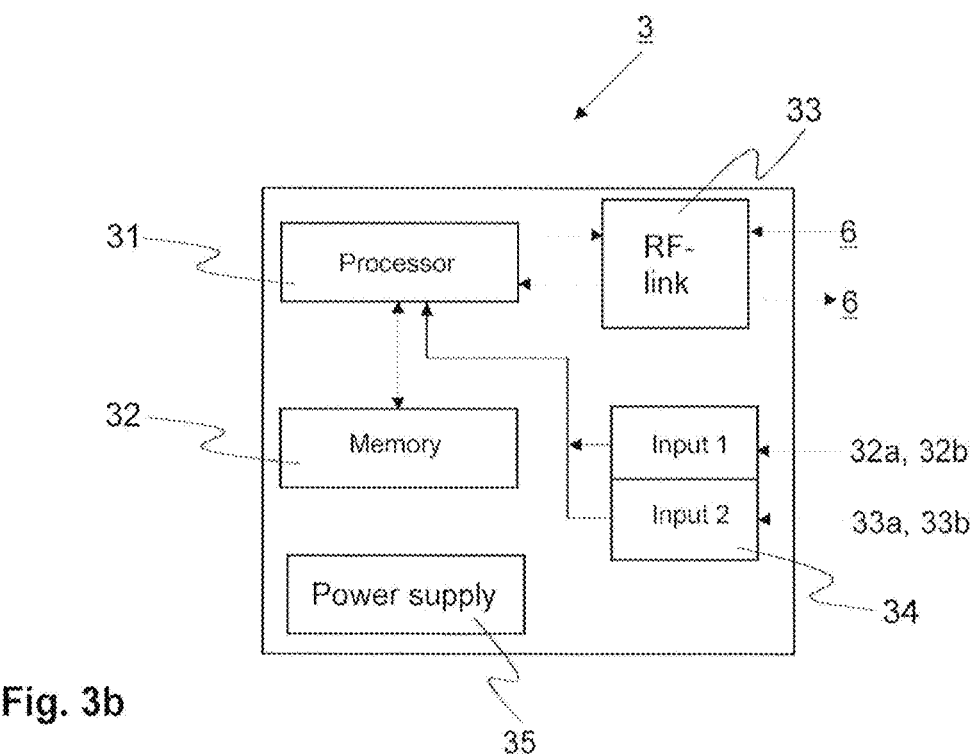
FIG. 3b shows functional electrical elements utilized in the implementation of a suppressor according to the invention.

FIG. 3b shows some main functional electrical elements of a suppressor 3 according to the invention that may be utilized in a sniper rifle 1 for increasing a hit probability of shots.

The suppressor 3 includes a power supply 35. The power supply 69 may be a battery or a solar cell.

The suppressor 3 comprises a processor 31 or processor means, which advantageously comprise an arithmetic logic unit, a number of different registers and control circuits. A data storing arrangement, such as memory unit 32, whereon computer-readable information such as programs utilized accomplishing calculation of the bullet velocity measurement data may be stored at least temporally, has been connected to the processor 61. The memory 62 typically contain memory units, which allow both reading and writing functions (Random Access Memory, RAM), and memory units containing non-volatile memory, from which data can only be read (Read Only Memory, ROM).

The suppressor 3 comprises advantageously also an electrical input element 34, which may comprise input 1 and input 2. Input 1 advantageously comprise either wired or wireless electrical connection elements to the capacitive sensors 32a and 33a and input 2 inductive sensors 32b and 33b. Both to the capacitive sensors 32a and 33a and the inductive sensors 32b and 33b generate electrical signals by which the processor 31 is capable first to combine to one graph and in a second step to calculate from the created graph a bullet velocity of a fired shot.

The suppressor 3 comprises advantageously also an RF-link element 33. The RF-link element 33 may be for example a transmitter-receiver of a Bluetooth® network, infra-red (IR) network, ZigBee® network, UWB network (Ultra-WideBand) or WLAN-network (Wireless Local Area Network). Via the utilized RF-link element 33 the suppressor 3 advantageously send the calculated velocity of a bullet to the data logger 6.

In one advantageous embodiment the data logger 6 may send different kind of commands to the suppressor 3 via the RF-link element 33. For example the data logger 6 may control ON-OFF state of the suppressor 3 for saving the battery energy.

Figure 3C:
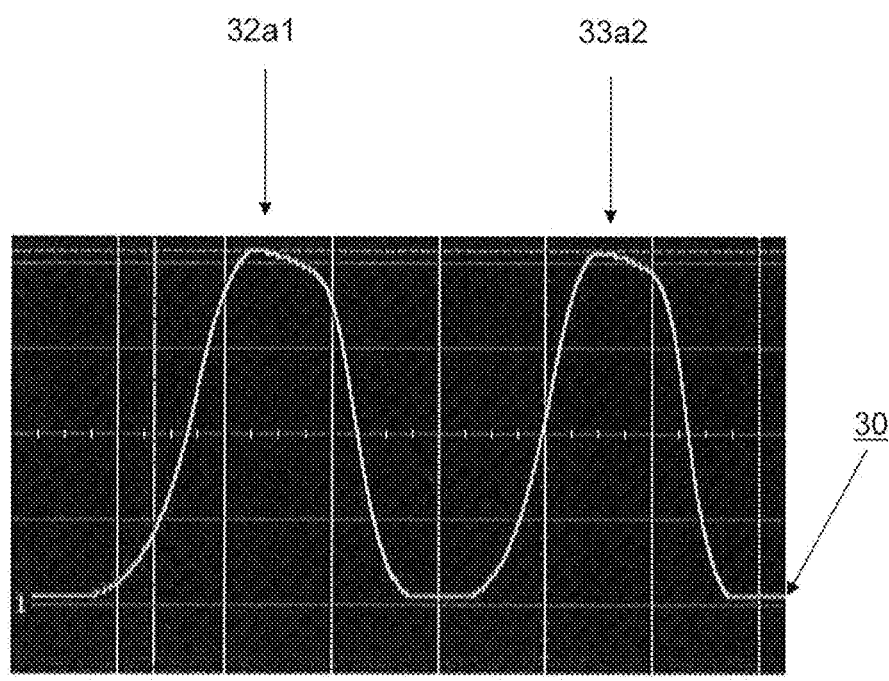
FIG. 3c shows an example of electrical signal generated in a suppressor according to the invention.

FIG. 3c shows an exemplary timing graph 30 on an oscilloscope display where the suppressor 3 according to the invention has combined the signal 32a1 of the first capacitive sensor 32a and of the signal 33a1 of the second capacitive 33a sensor to one timing graph 30.

In one advantageous embodiment the time marks to be utilized in the velocity measurement is defined to be 50% point of the maximum values on rising slopes of the first and second capacitive signals 32a1 and 33a2

The alternative solution where inductive sensors 32b and 33b have been utilized generates essentially similar type of graph.

Figure 4:
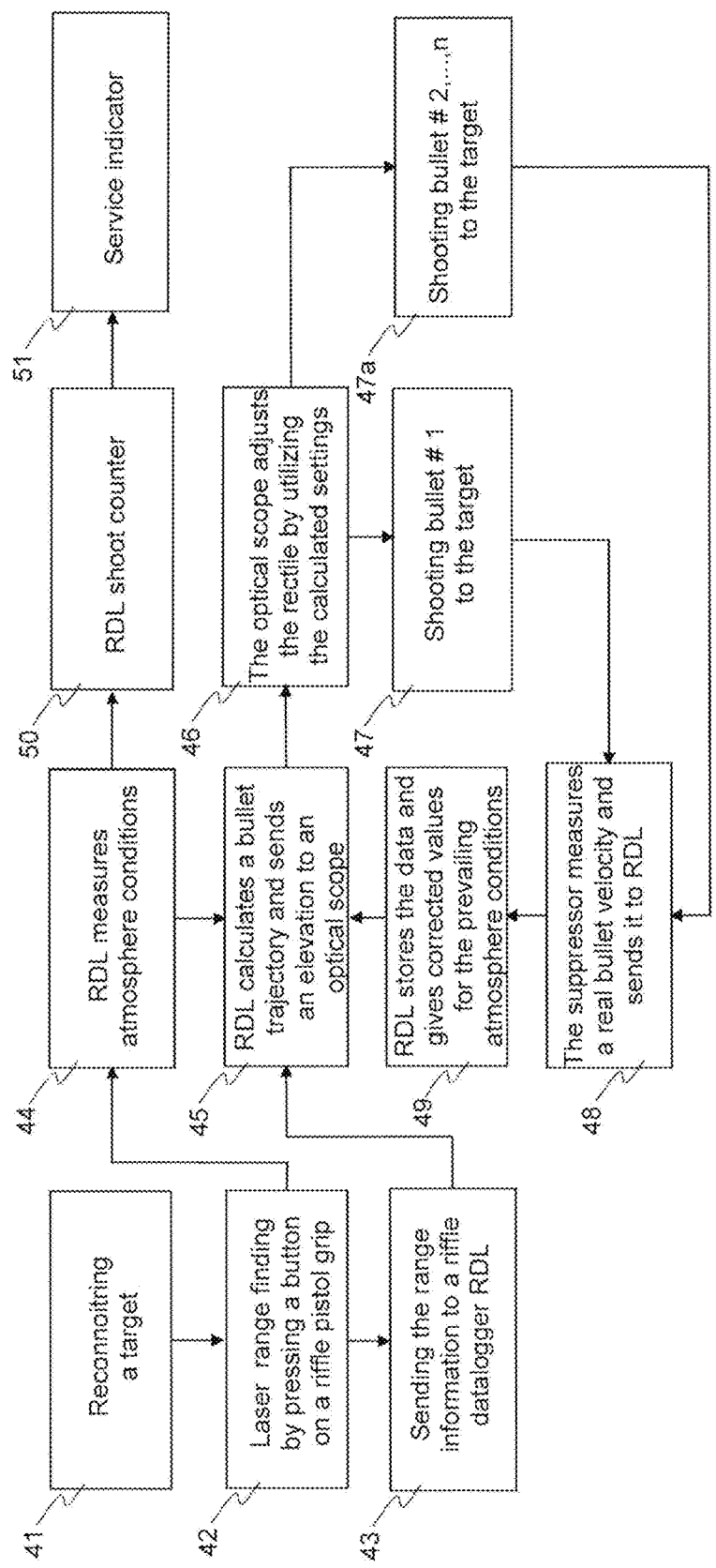
FIG. 4 shows in an exemplary block chart main steps of the method according to the invention

FIG. 4 depicts an example block diagram main steps of the aiming method according to the invention that increases a hit probability of a shot fired by a sniper rifle. The depicted aiming method is a closed loop ballistic control process.

In step 41 a sniper of the sniper rifle 1 reconnoitres a target. The target may be detected before for example by observing the terrain through an optical scope 2 of the sniper rifle 1.

In step 42 the sniper pushes a trigger 4 of the sniper rifle 1 to a first position. In the first position a range measurement apparatus 21 integrated to the optical scope 2 measures a range 21 to the detected target. Advantageously the measurement apparatus 21 is a laser based range measurement equipment. In one advantageous embodiment at the same time a GPS receiver of the sniper rifle 1 calculates the coordinates of the sniper rifle 1.

In step 43 the range measurement apparatus 21 sends at least the measured range 21a and advantageously also determined geographical coordinates to the data logger 6 of the sniper rifle 1.

In step 44 the data logger 6 retrieves 6a the latest meteorological measurement results or measures them and saves them to the memory 62 of the data logger 6. The meteorological measurement results comprise at least current temperature, humidity and air pressure values. Advantageously also the current geographical coordinates of the sniper rifle 1, calculated by GPS receiver 68, and heading and position of the barrel 5, i.e. the angle of the barrel of the sniper rifle from the horizontal plane, of the sniper rifle 1 are measured and stored in the memory 62 of the data logger 6.

Advantageously the data logger 6 may also estimate geographical coordinates of the target by combining received GPS information, measured range to the target and heading information of the sniper rifle 1.

In step 45 the data logger 6 calculates a bullet trajectory for a shot to be fired based on the received meteorological and range measurement results. For a first shot to be fired in the current location the data logger 6 advantageously utilizes also a bullet velocity measured in similar meteorological conditions earlier. Based on the calculated bullet trajectory the data logger 6 sends to the optical scope 2 at least a corrected elevation angle to be utilized in the shot.

In step 46 the optical scope 2 adjusts the reticle position in the optical scope 2 by utilizing at least the received elevation setting that the data logger 6 has sent.

In step 47 the sniper shoot bullet #1 to the target.

In step 48 the suppressor 3 according to the invention measures a velocity 31 of the shot bullet and sends 31a it to the data logger 6.

In step 49 the data logger 6 first stores the received bullet velocity data. After that the data logger 6 calculates, by utilizing now the last-measured bullet velocity 31, corrected settings for the next shot to be fired in the prevailing meteorological conditions. After that the aiming process returns to step 45.

After returning to step 45 the data logger 6 calculates a new bullet trajectory and sends corrected bullet trajectory settings to the optical scope 2.

In step 46 the optical scope 2 adjusts the reticle of the optical scope 2 by utilizing the corrected settings that the data logger 6 has sent. Then in step 47a the sniper shoot bullet #2, . . . # n against the target.

The aiming process according to the invention returns each time back to the step 48 when the sniper has shot.

The depicted aiming loop 45, 46, 47, 47a, 48 49 and again 45 is utilized as long as the sniper rifle 1 is utilized in the current location.

In step 50 of an additional process branch it is depicted in FIG. 4 that after each shot a counter integrated in the data logger 6 increases a number of fired shots to a counter. The shot counter value may advantageously be transmitted wirelessly to a service indicator data base 51. The information stored in the data base 51 may comprise location of each shot, when and where and number of shots fired. The information may be utilized as a maintenance detector of the sniper rifle.

Some advantageous embodiments of the aiming method and aiming system according to the invention described above. The invention is not limited to the embodiments described above, but the inventive idea can be applied in numerous ways within the scope of the claims.

The invention claimed is:

1. An aiming system for increasing a hit probability of a sniper rifle, the aiming system comprising:
    a scope connected to the sniper rifle comprising means configured to measure a range to a target by a laser apparatus when a trigger in a sniper rifle grip is pressed to a first position, and
    a data logger of the sniper rifle being configured to measure
        local meteorological data comprising at least temperature, humidity and air pressure
        a geographical coordinates of the sniper rifle
        a heading of a barrel of the sniper rifle
        a position of the barrel of the sniper rifle, and
        receive the range to the target sent by the scope, and that
    the data logger is configured to calculate a bullet trajectory for a shot by utilizing the range, meteorological data and for a first shot to be fired velocity information of a bullet shot in the similar meteorological conditions stored in the data logger and based on the calculated bullet trajectory to send elevation information to the scope, and that
    the sniper rifle is configured to shoot a bullet when the trigger in the rifle grip is pressed to a second position,
    wherein the measurement system further comprises
    a suppressor configured to measure a velocity of the shot bullet and to send wirelessly the measured velocity of the shot bullet to the data logger, and
    the data logger configured to utilize the measured velocity of the shot bullet when calculating an improved bullet trajectory for a next bullet to be shoot.

2. The aiming system according to claim 1, wherein the suppressor comprises a first sound trap including a first capacitive sensor assembled a fixed distance from a second sound trap including a second capacitive sensor.

3. The aiming system according to claim 2, wherein each of said either capacitive or inductive sensors is configured to generate an electrical pulse when the fired bullet passes by said capacitive or inductive sensors.

4. The aiming system according to claim 3, wherein the suppressor comprises means configured to calculate the velocity of the shot bullet by dividing a timing difference between electrical pulses of the first capacitive or inductive sensor and the second capacitive or inductive sensor with the fixed distance between the first capacitive or inductive sensor and the second capacitive or inductive sensor and means to transmit the calculated bullet velocity wirelessly to the data logger.

5. The aiming system according to claim 1, wherein the suppressor comprises a first sound trap including a first inductive sensor assembled a fixed distance from a second sound trap including a second inductive sensor.

6. The aiming system according to claim 1, wherein the suppressor comprises at least two sound traps including either capacitive or inductive sensors that both sensors are configured to generate an electrical pulse when a shot bullet passes by said capacitive or inductive sensors.

7. The aiming system according to claim 6, wherein the suppressor comprises means configured to calculate a velocity of the shot bullet by dividing a timing difference between electrical pulses of the first capacitive or inductive sensor and the second capacitive or inductive sensor with the fixed distance between the first capacitive or inductive sensor and the second capacitive or inductive sensor and that the suppressor comprises further means to transmit the calculated bullet velocity wirelessly to a data logger of a sniper rifle.

8. An aiming method for increasing a hit probability of a sniper rifle, the method comprising:
    measuring a range to a target by a scope connected to sniper the rifle and sending the measured range to a data logger of the sniper rifle when a trigger of a rifle grip of the sniper rifle is pressed to a first position
    measuring by the data logger
        local meteorological data comprising at least temperature, humidity and air pressure
        a location of the sniper rifle
        a heading of a barrel of the rifle, and
        a position of the barrel of the sniper rifle, and
    calculating by the data logger a bullet trajectory for a shot by utilizing the measured range, meteorological measurement data and for a first shot to be fired velocity information of a bullet shot in the similar meteorological conditions stored in the data logger
    sending a calculated elevation information to the scope, and
    shooting by the sniper rifle when the trigger of the rifle grip is pressed to a second position,
    wherein the method further comprises:
    measuring a velocity of the shot bullet by a suppressor and sending wirelessly the measured velocity from the suppressor to the data logger,
    storing the measured bullet velocity in a memory of the data logger, and
    calculating an improved bullet trajectory for a next bullet to be shot by the data logger by utilizing also the stored velocity data of the shot bullet.

9. The aiming method according to claim 8, wherein the suppressor comprises two either capacitive or inductive sensors both generating an electrical pulse when the shot bullet passes by said capacitive or inductive sensors.

10. The aiming method according to claim 9, wherein the suppressor calculates the velocity of the shot bullet by dividing a timing difference between electrical pulses of the first capacitive or inductive sensor and the second capacitive or inductive sensor with a fixed distance between the first capacitive or inductive sensor and the second capacitive or inductive sensor.

11. A computer program product comprising computer program code means adapted to perform the following program code steps when said program is executed on a processor of a data logger of a sniper rifle for increasing a hit probability, the computer program product comprising:
    code means for measuring a range to a target by utilizing a scope connected to the sniper rifle code means for measuring
   local meteorological data comprising at least temperature, humidity and air pressure
   a location of the sniper rifle
   a heading of a barrel of the rifle, and
   a position of the barrel of the sniper rifle, and
code means for calculating a bullet trajectory for a shot by utilizing the measured range, meteorological measurement data and for a first shot to be fired velocity information of a bullet shot in the similar meteorological conditions stored in the data logger, and
code means for sending a calculated elevation information to the scope, wherein the computer program product further comprises:
code means for receiving a velocity of the shot bullet measured by a suppressor
code means for storing the received bullet velocity in a memory of the data logger, and
code means for calculating an improved bullet trajectory for a next bullet to be shot by utilizing also the stored velocity data of the shot bullet.

* * * * *